United States Patent [19]
Banks et al.

[11] 3,933,514
[45] Jan. 20, 1976

[54] HIGH STRENGTH, WATER RESISTANT SILICATE FOAM

[75] Inventors: William P. Banks; Jon R. Carlson; Donald E. Becker, all of Ponca City, Okla.

[73] Assignee: Continental Oil Company, Ponca City, Okla.

[22] Filed: Apr. 30, 1973

[21] Appl. No.: 356,027

[52] U.S. Cl. ............................ 106/75; 106/84
[51] Int. Cl.² ............................ C04B 35/16
[58] Field of Search ............... 106/40 R, 75, 84

[56] References Cited
UNITED STATES PATENTS

| | | | |
|---|---|---|---|
| 3,661,602 | 5/1972 | Gerow | 106/75 |
| 3,725,095 | 4/1973 | Weidman et al. | 106/75 |
| 3,741,898 | 6/1973 | Mallow et al. | 106/75 |
| 3,776,746 | 12/1973 | Abe | 106/75 |

*Primary Examiner*—J. Poer

[57] ABSTRACT

An alkali metal silicate foam composition comprising preferably sodium silicate, cementing agent such as sodium silicofluoride, gelling agent such as linoleic acid and filler such as glass fiber mixed with water and blowing agent to provide foams having high strength, high water resistance and low shrinkage upon curing. Amides and halo-alcohols are used as gelling agents in preferred compositions for exceptional strength and water resistance. Vermiculite and perlite are preferred fillers for a low shrinkage foam composition.

1 Claim, No Drawings

HIGH STRENGTH, WATER RESISTANT SILICATE FOAM

BACKGROUND OF THE INVENTION

1. Field of the Invention

This invention relates to silicate foam insulating and structural compositions, and especially to a light weight, high strength, high water resistant, low shrinkage silicate foam and process for producing the foam.

2. Brief Description of the Prior Art

Aqueous silicate compositions have been used extensively in the art for specialized applications such as cements, insulation, coatings, and matrix for refractory or ablation aggregate. Silicate foam in inherently fire resistant and has excellent insulation properties. The heat transfer coefficient of silicate foam compares favorably with that of polystyrene and polyurethane foam and silicate foam has a decomposition temperature more than five times greater than these well known insulating foams.

Even with extensive work in the art, prior art silicate foam compositions have not been practical because of poor water resistance, low strength and difficulties in fabrication of a foam structure. Prior art compositions could not be practically fabricated into shapes due to composition instability and excessive shrinkage. Furthermore, these compositions could not be economically applied by commercial spraying techniques due to composition instability, difficulties in controlling viscosity and poor adhesion. Thus, there has been a need and a readily available market for a versatile silicate foam composition having a combination of high strength, good water resistance, good adhesion characteristics and acceptable fabrication characteristics.

SUMMARY OF THE INVENTION

It has now been discovered that an inexpensive, practical silicate foam composition can be produced using a particular recipe with only a few critical ingredients and a simple preparation method. The silicate foam composition of this invention can be easily prepared and fabricated to produce a high strength, essentially waterproof foam, in the form of insulation or structural shapes by molding or spraying techniques. This silicate foam composition has the unique combination of low density, high strength, water resistance, fire resistance and good acoustical and thermal insulation properties. It is produced by maintaining the few critical ingredients within the ranges of the recipe. As described herein, the composition consisting essentially of the named critical ingredients permits the use of reasonable amounts of other ingredients which do not adversely affect the combination and use of critical ingredients.

It has now been discovered that a particular combination of gelling agent, specifically an amide, and/or particulate filler, especially vermiculite and perlite, produce a high strength, low shrinkage silicate foam. The silicate foam of this application represents a significant improvement over the foam described in copending commonly owned application U.S. Ser. No. 225,763 filed Feb. 14, 1972, now abandoned. The disclosure of said application is incorporated by reference to any extent necessary. High shrinkage has been a problem preventing commercial acceptance of the foam despite its excellent insulation properties. The silicate foam of this invention provides a foam having excellent insulating properties plus high strength, high water resistance and low shrinkage.

By this invention there is provided a composition for producing a fire-resistant silicate foam having high strength, low shrinkage and high water resistance by uniformly mixing as an aqueous silicate dispersion in water on the basis of about 100 parts by weight foam composition consisting essentially of:

a. about 25–36 parts water soluble alkali metal silicate in about 45–60 parts of said water;
b. about 8–20 parts cementing agent selected from sodium silicofluoride, zinc carbonate, magnesium carbonate, aluminum phosphate, zinc acetate and mixture thereof;
c. about 0.2–6 parts gelling agent selected from low molecular weight amide, and a mixture of amide and low molecular weight haloalcohol;
d. about 0.1–10 parts fibrous filler selected from glass, mineral wool, asbestos, cellulose, metal fibers, ceramic fibers, carbon fibers, synthetic fiber and mixture thereof; and,
e. about 0.1–20 parts particulate filler selected from vermiculite, perlite and a mixture thereof.

The basic silicate foam composition exhibits the unique combination of properties which make use of the silicate foam practical. However, certain silicate foam compositions have exceptionally high strength and water resistance. Incorporation of certain halo- or thioalcohols into the foam produces a silicate foam which is essentially waterproof. Each of these modifications also enhances other foam properties which make the compositions of this invention even more unique.

This invention also provides a uniquely simple and practical process for producing the inexpensive silicate foam compositions of this invention. Basically, this process comprises mixing the critical composition ingredients with water and the blowing agent, preferably air. The ingredients can be added all at once or stepwise. The cementing agent and gelling agent are preferably added last. The ingredients are mixed until the composition is relatively uniform and the viscosity begins to rise substantially. The mixing period is determined by the viscosity range required for the particular method of fabrication or application used. This simplified process of this invention produces a surprisingly uniform creamy silicate foam having unique properties in that each composition exhibits low density, high strength, good water resistance and little or no difficulty with shrinkage and viscosity stability on fabrication or spraying.

BRIEF DESCRIPTION OF THE PREFERRED EMBODIMENTS

The preferred composition of this invention comprises a mixture of (a) about 31 parts water soluble sodium silicate, (b) about 14 parts sodium silicofluoride, (c) about 2 parts chopped glass fiber, and (d) about 1 part tall oil, linoleic acid, oleic acid, amide or mixture thereof mixed with about 52 parts water and entrained air per hundred parts foam by weight. Other blowing agents can be used but air is preferred for uniform consistency in mixing and curing. Additional additives or fillers can be used with glass fiber to obtain particular properties such as color, lower cost, particular compression properties, particular strength properties, or particular insulation properties.

This composition can be prepared by the simplified process of this invention in a relatively short processing time. The processing time consists of time for mixing, coagulation, set-up and curing of the composition. Coagulation time is the phase from when the foam begins to thicken up to the point where it does not flow appreciably. Set-up time is the hardening phase when the foam attains strength and water resistance. The foam changes quickly from a frothy liquid or paste to a resilient gel and then gradually to a solid foam. The liquid or paste composition can be readily fabricated by known methods such as extruding, molding or simply pouring. It can also be applied by spraying. After the composition is fabricated into insulating or structural shapes such as sheets, curved sheets, surface coating or other shapes it can be cured by any one of several methods to form a solid foam. In addition, partially or completely cured foam can be broken into aggregate which can be formed and thermally fused to produce a shaped object. For fusing foam aggregate additional water (1–15%) and particle sizing are preferred for uniform foam cell structure. Microwave heating is preferred for fusing the silicate foam aggregate into a very light weight foam structure.

In one preferred process the ingredients of the recipe are added to a blender with water and mixed in the presence of air at a pressure of about 5–300 p.s.i.g. The preferred air pressure varies from about 20 p.s.i.g. for producing relatively dense, high strength foams up to about 100 p.s.i.g. for producing low density foams. The mixture is agitated until the ingredients are uniformly mixed and begin to react. The composition viscosity begins to increase sharply, indicating reaction of the ingredients. The range of the viscosity can be controlled to some degree by varying the quantity of water used. The minimum amount of water required is that which is necessary to thoroughly wet and permit reaction of the ingredients. Excessive water reduces the viscosity and increases the reaction time, but also lowers the ultimate strength of the composition. Agitation of the mixture can be accomplished by pumping gas through the mixture, by circulating fluid through the reaction medium, or by mechanically agitating the mixture. The blowing agent can be incorporated into the mixture as a dissolved or entrained gas or by adding a gas releasing agent to the composition to produce very low density foam. As used herein, low density means about 5–20 pounds per cubic foot (lb./c.f.), medium density about 20–40 lb/c.f. and high density about 40–60 lb/c.f. Low density is also used to mean density below about 50 lb./c.f.

At a predetermined viscosity the composition can be applied by one of several techniques. The method of application or fabrication determines the composition viscosity range which can be used. This viscosity range can be readily determined by a minimum amount of experimentation. It is conveniently noted with mechanical mixing by monitoring the mixer speed. This viscosity can vary with fabrication conditions and the apparatus used. For instance, the viscosity can vary over a wide range if the composition is to be applied by hand, by extrusion, or by molding. That is, the composition can vary from a liquid to a thick paste. If the composition is to be applied by spraying or pouring, the viscosity should be maintained within a relatively narrow range and should be easily flowable. For precise control of the composition viscosity, hardening agent or a quick setting agent can be added to the mixture as the last ingredient or as the composition is applied.

In a preferred process for producing the composition of this invention, the water soluble silicate and water are premixed to form an aqueous dispersion or solution. The other ingredients are then added to this solution with the sizing agent and hardening agent preferably being added last. With this method the quantity of water used is generally slightly in excess of that required to completely dissolve the silicate. An excess of water can be used to reduce the composition viscosity for easier mixing. Conversely, less water can be used. The preferred amount of water is that required to completely dissolve the silicate.

In another preferred process the dry composition ingredients; namely, alkali metal silicate, sodium silicofluoride, and glass fiber are blended to form a dry premix. The normally liquid ingredients; that is, hardening agent and water, are then blended with this dry premix. Silicate foam prepared this way has slighly lower strength than that of the above method unless the silicate is dispersed and aged for about 24 hours before use. The silicate dissolves slowly. The 24 hour period is thought to be necessary to obtain a solution or uniform dispersion. This dry premix method is advantageously used where a paste composition is desired. For either of these methods the blowing agent can be added as a dry, gas-releasing compound or incorporated under pressure as dissolved or entrained gas.

The simple process and composition of this invention produces a silicate foam which can be readily applied by conventional techniques, even air spraying. The reasons for this versatility of application and the unique foam properties are not fully understood since both process and composition are uniquely simple. As shown in the drawing, foam viscosity increases rapidly for about 3–4 minutes at which point the rate of viscosity increase is less but is relatively constant up to about 25 minutes. It has been found that the preferred compositions of this invention can be air-sprayed onto vertical and overhead surfaces. Sprayed and poured silicate foam of this invention prepared by this process exhibit higher strength and higher water-resistance strength retention than previously known silicate foam.

Curing a composition of this invention can be accomplished by any one of several methods. These methods include (1) maintaining the composition at a temperature in the range of about 0°–100°C., (2) by heating, (3) by incorporating a quick setting agent in the composition, or (4) by exposing the composition to a quick setting agent. The particular method for curing is determined by the method of application and the curing time desired. For instance, the composition is preferably cured by simply maintaining it at a temperature of about 0°–100°C. under atmospheric conditions. This method is particularly advantageous when the composition has been applied by spraying. High temperatures can be used for curing in which case the moisture in the composition evaporates acting as a foaming agent in which case an additional foaming agent is not necessary. Heating decreases the curing time for the composition as well as promoting evaporation of the moisture. In the atmospheric curing method the composition is substantially cured within several hours and the composition should have a relatively high viscosity upon fabrication to maintain its shape. Incorporating a quick setting agent or exposing the composition to a quick setting agent causes initial coagulation and curing in a period on the order of about 0.25–1 minute.

Any conventional method of heating can be used for curing silicate foam of this invention. However, since the foam is a good insulator, convection heating will be slow or practically limited to thin coatings or shapes. Radiation heating, especially microwave, is preferred for fast curing and for foam using water in the composition as a blowing agent. Commercial microwave ovens can expand and cure foam shape 2-3 inches thick in less than about 15 minutes.

Surface exposure can be used to hold an easily flowable foam in place, allowing atmospheric curing of the inside. With any of the above methods initial curing involves coagulation and setting up of the composition to form a hard yet resilient structure typically having a satin gloss surface texture and a uniform creamy white appearance. This appearance can be modified by optical fillers, pigments or surface coatings. Further curing without heating involves gradual loss of moisture until the composition stabilizes at about 12% free water and about 10% adsorbed volatile matter. Generally, the compositions of this invention cure under atmospheric conditions without significant changes in volume which is particularly advantageous for molded, structural and insulating shapes. In preferred atmospheric curing, the foam must be allowed to set-up and lose water. The rate of these processes are proportional to temperature; therefore, under some conditions heating and a relatively dry environment may be necessary for curing. Freezing and high moisture conditions should be avoided until the foam is fully cured. For high moisture conditions particular ingredients such as an amide or haloalcohol can be incorporated in the composition or used to surface treat the foam.

The silicate foam of this invention can be used by itself for insulation or structural shapes or the foam can be fabricated with reinforcing. Preferred reinforcing includes fiber and sheet structures such as netting, honeycomb, sheet, cord, or cloth. These reinforcing structures can be paper, nylon, cotton, or other conventional reinforcing material. Steel rod and wire can also be used.

Foam structures can be fabricated using these reinforcing materials for strength, flexibility, shatter prevention, surface protection, joining shapes or attaching shapes to other structures. The reinforcing can be paper, cloth, or other media which can make curing faster by wicking or addition of a quick setting agent to the reinforcing media. A preferred reinforced structure comprises Kraft paper honeycomb poured full of foam. Reinforcing can be honeycomb, fabric, stranded fiber, netting, wire or perforated sheet of the above material.

Such a foam honeycomb panel can provide high strength building insulation which can double as interior wall sheeting. This sheeting can use treated honeycomb for good fire resistance. It can also have sheeting on at least one face. It can be nailed and cut by conventional woodworking techniques. Such honeycomb paneling can be fabricated in place by pouring silicate foam into mounted honeycomb producing a relatively air tight structure or such foam paneling can be prefabricated and used as ordinary panels. The foam is permeable to air and moisture but can be sealed by coatings, preferably organic based sealants.

The silicate foam can also be applied to a surface by spraying. A sprayed foam coating exhibits good adhesion to most surfaces; therefore, foam is an excellent coating for both insulation and strength. Sprayed foam coating is useful for preventing spalling, improving lighting, reducing leakage of dangerous gases and moisture and reducing the fire hazard in mine shafts, especially coal mines. For such applications the foam can be applied with or without reinforcing material as described above. Certain components and additives such as the amides, haloalcohols and thioalcohols release gases such as $NH_3$, $HCl$ or $H_2S$, therefore, use of these components should be avoided in confined areas where these gases would be objectionable.

The excellent strength, weather resistance, fire resistance and insulation properties make the silicate foam of this invention useful as an essentially fire proof insulation for installations in areas of extreme temperature, of fire hazards and of hazards to ecology. Such areas of use include insulation for pipelines, wells, well heads, storage tanks, appurtenant equipment and combinations thereof, especially for petroleum or chemicals. The silicate foam of this invention is especially useful for thermally insulating buildings and equipment by application to soil surface in tundra regions, thereby preventing damage to permafrost. The foam can also be advantageous for off-shore well applications. Some provision must be made for curing in low temperature areas, such as use of accelerators and/or application of heat. The open cell porous structure of the foam with hydrocarbon attracting additives such as amide, alcohols, and fatty acids would tend to adsorb many chemicals and hydrocarbons, reducing problems with small leaks. To increase the exposed open cell foam structure, the foam surface can be shaved or abraded to remove the dense foam layer which usually forms. Fillers or fabric can be embedded in foam to modify the foam surface and exterior layer to increase or decrease such properties. The cell structure of the foam give it good acoustical properties which make it useful for installations such as ceiling tile and wall coverings in domestic and industrial locations. The foam is also useful for cementing and sealing walls of porous building blocks.

The foam of this invention also has unexpected mechanical energy absorption characteristics which make it useful for reducing damage to colliding vehicles or bodies. Such high strength foam can be used as an energy absorbing medium for controlled collapse because the energy absorption is practically constant during collapse of the foam and the foam strength can be regulated by the use of additives such as amides. The foam can be used for the dash, bumpershocks or fuel tank insulation of vehicles. It can be used for support members in applications such as buildings or mines.

The high strength silicate foam of this invention exhibits unusual water resistance, moisture absorption and water leaching properties. As shown by the samples of Examples III and VIII, the foam typically has compressive strength above about 100 psi and the strength often increases after water leaching although the materials removed by leaching are about the same as for comparable prior art compositions.

Any water soluble silicate can be used which cures or sets up in the presence of weakly acidic compounds such as sodium silicofluoride. However, sodium or potassium silicates and mixtures thereof are preferred to produce compositions of this invention with the unique combinations of properties such as strength, water resistance and workability. These preferred silicates should have the silicate oxide to alkali metal oxide molecular ratio in the range of about 1:1 to 4:1 for good solubility, workability and curing characteristics. Other water soluble alkali metal salts and divalent metal salts can be added to the composition to impart particular properties such as water or acid resistance, color, and crosslinking.

The compositions of this invention require particular cementing agents to produce the unique combination of properties. Sodium silicofluoride is preferred for versatility in curing and producing a composition with high ultimate strength and resiliency. Other water soluble silicofluoride metal salts that react with silicates in aqueous medium to form a silicate chain can be used as the cementing agent. Certain multivalent metal salts such as zinc carbonate, magnesium carbonate, aluminum phosphate, zinc acetate, and zinc sulfate also react with silicates to form the silicate chain; therefore, these compounds can be used. Solubility and reaction speed of these compounds determine coagulation and curing time. Therefore, the particular combination of sizing agents will be determined by the desired mixing time and set-up time. Sodium silicofluoride is preferred for application versatility and intermediate processing time. It allows a mixing time on the order of 3 minutes with a coagulation time of about 15 minutes and produces a very hard silicate foam.

Another critical ingredient for the compositions of this invention is the gelling agent. Gelling agents are compounds that are weak acids or hydrolyze in basic aqueous solutions to produce weak acids or salts of weak acids. These compounds must be at least partially soluble in the silicate-water mixture and include organic fatty acids such as tall oil, linoleic acid and oleic acid, low molecular weight amides, low molecular anhydrides, low molecular weight esters, and alkali metal salts such as formate, citrate, oxylate, and acetate. Carbon dioxide, and other compounds that release carbon dioxide, can be used as quick setting gelling agents. Organic fatty acids are preferred gelling agents because they dissolve and hydrolyze at a uniform slow rate in aqueous silicate medium. The preferred gelling agents include linoleic acid, oleic acid, sodium oxalate, amides and haloalcohols. For producing uniform creamy white foams of this invention, linoleic acid or oleic acid is preferred. For producing fast curing, high water resistant foam, linoleic acid mixed with amides are preferred. Haloalcohols can be used as gelling agents to produce essentially waterproof foam. Haloalcohols are preferably used in small quantities in conjunction with another gelling agent. When the composition is cured by heat, care must be taken to avoid loss of the haloalcohol. The haloalcohol can also be applied to the foam surface to produce an essentially waterproof foam surface. As pointed out above, amide, haloalcohol and thioalcohol produce certain gases which may be objectionable in certain application.

Only certain amides and combination of amides have been found useful for high strength and high water-resistant foams described herein. Low molecular weight amides can be used but only acetamide, formamide, dimethyl formamide, and a mixture of these produce a unique increase in foam strength and water resistance. Mixtures of amides preferably contain at least 50% by weight acetamide. Low molecular weight amides which can be used to produce the low shrinkage foams of this invention include acetamide, formamide, dimethyl formamide, propionamide, nonamide, stearamide, benzene sulfonamide and malonamide. These can be described as amides having from 1-30, preferably 1-30 carbon atoms in alkyl or aryl radicals attached to the amide directly or indirectly as through carbonyl radical. The radical can be mono, di or tribasic with 1-3 amide groups per radical.

Low molecular weight haloalchols and thioalcohols can be used to produce these essentially waterproof foams of this invention. These include substantially linear substituted alcohols having about 1-7 carbon atoms in the primary chain. Preferred alcohols include the $C_2$–$C_5$ alpha-omega chloroalcohols such as chloroethanol, 1-chloro-2-propanol, and 1-chloro-2-butanol. Aromatic haloalcohols having a 1-5 carbon haloalkylalcohol substituent can also be used.

One or more foaming agents are incorporated into the mixture of aqueous silicate, cementing agent, gelling agent, and filler to produce the foam silicate composition of this invention. Foaming is necessary to produce a composition having the particular combinations of density, strength, water resistance, workability and insulation properties. The foaming agent can be a gas or gas forming compound commonly known as a blowing agent typically used to produce elastomeric or plastic foams such as polyurethane and polystyrene. Blowing agents which can be used include air; low molecular weight halogenated hydrocarbons; inert gases such as nitrogen, helium, and hydrogen; low molecular weight volatile hydrocarbons and their derivatives such as isopropyl ether; or water which is typically vaporized by heat in situ. Air is preferred for versatility in processing and for ease in mixing and curing the composition. Although carbon dioxide causes quick setting of the composition, it can be used as a foaming agent by adding it immediately prior to fabrication or in the form of a compound which slowly releases carbon dioxide. Gaseous blowing agents such as air and the low molecular weight fluorinated hydrocarbons are preferably incorporated in the composition by mixing under pressure with the other ingredients and allowing the composition to expand during fabrication. The amount of blowing agent can vary from a trace up to about 25% by weight.

Fibrous filler is essential to the preferred compositions of this invention. Particulate and fibrous fillers such as glass, asbestos, cellulose fiber, sand, clay, fly ash, pigment, sulfur, perlite, talc, vermiculite, and pesticide, can be used. About 0.25-5 parts of fibrous filler such as glass fiber, asbestos or cellulose fiber, are critical for the high strength water resistant compositions of this invention. Chopped glass fiber, preferably of about ⅛-¼ inch length, is essential and it preferably should be treated to resist alkaline silicate media. Larger amounts of fibrous and other fillers can be used in the compositons but are not economical. Excessive filler and certain combinations of fillers produce compositions with less than optimum properties, especially strength. Specific fillers, such as sand or sulfur, can be used to reduce unit cost or to produce particular properties such as vermine repellant characteristics. Finely ground and sized expanded perlite (aluminum sulfate volcanic ash) is preferred for excellent high K factor low density insulation. Preferred perlite has a density of about 3-4.5 lb./c.f. It has been found that low shrinkage silicate foam having excellent commercial acceptance and application can be prepared using amide as the gelling agent or substantially all amide as the gelling agent. Shrinkage can also be reduced by using a particular type of particulate filler, especially fly-ash beads, vermiculite and perlite. The type of particulate filler which produces low shrinkage foam is thought to be relatively inert material which is relatively firm but resilient. Hard particles such as glass spheres and perlite can be used but crush easily. Particles such as vermiculite and expanded cellular polystyrene (e.g. styrofoam) are relatively inert, firm, yet resilient fillers. Polystyrene is combustible, therefore, has limited application. Particulate fillers should have a bulk density of about 4–6 pound per cubic foot and a particle size distribution with a substantial portion of the particles in the range of about 8–20 mesh, (i.e. standard Tyler screen number) as shown in Table L. As shown in the tables for preferred low shrinkage composition at least 2 parts per hundred parts foam (pph) preferred particulate filler, especially perlite and vermiculite, should be used to produce low shrinkage foam, i.e., less than about 3% shrinkage. The preferred particulate filler range is about 2–12 pph. At least about 0.25 pph amide, haloalcohol or mixed amide and haloalcohol gelling agent, and preferably about 0.25–2.5 pph, should be used for preferred low shrinkage silicate foam compositions. Higher concentrations of preferred particulate filler and preferred gelling agent (either preferred ingredient used separate or in combination with the other preferred ingredient) produce foam compositions having lower shrinkage than those of the preferred ranges but are not preferred for economy or workability of the uncured foam.

Surfactants are an optional ingredient for producing very low density, uniform compositions. Surfactants act as foam stabilizing agents. Any compatible surfactant such as soaps, detergents, fatty acid salts and other surface active agents can be used. These surfactants can be either anionic, cationic, or nonionic. Preferred compounds include dimethylcocoamine oxide, ether sulfate, and sodium dodecylbenzene sulfate. Nonionic or anionic surfactants are preferred for a smooth surface texture.

EXAMPLE I

Silicate foam is prepared by pouring 83 parts by weight aqueous sodium silicate containing about 37½% solids into a kitchen type cake mixer. Two parts ¼ inch chopped glass fiber, 14 parts fine sodium silicofluoride powder cementing agent and one part Crofatol 30 gelling agent available from Crosby Chemical Company were added to the aqueous silicate and mixed. A suitable aqueous sodium silicate, Grade 42, containing 37½% solids is available from Diamond-Shamrock Corporation. A finely powdered sodium silicofluoride is available from Olin Corporation as Grade 200. A ¼ inch chopped glass fiber is available as No. 847 from Owens-Corning Corporation.

Mixing the ingredients for three minutes blends in air forming a creamy white foam. After mixing about three minutes the foam is poured into cylindrical polyethylene molds forming 2 inches by 2 inches diameter samples. The samples are allowed to cure in the plastic molds at room temperature (about 75°F.) for 24 hours then the samples can be removed from the molds for further curing.

Foam samples are prepared according to the above procedure and recipe. The ingredients are mixed for various intervals and the Brookfield viscosity of the foam is measured for up to about 3 minutes. A sample is mixed for about 3 minutes and the viscosity is measured as the sample gels.

A standard Brookfield viscometer is used with spindle size No. 4 with a guard at about 30-1.5 r.p.m. under room conditions.

EXAMPLE II

Samples are prepared according to the procedure of Example I with different gelling agents in various amounts and tested for water resistance and compressive strength. The composition details and test results are given in Tabel A.

EXAMPLE III

Samples are prepared according to the recipe and procedure of Example I with different gelling agents used in various amounts. Samples cured for about one month at room conditions are tested for moisture absorption, moisture resistance and compressive strength.

Portions of the samples are tested for moisture absorption by exposing each sample at 75°F. to air saturated with water vapor and noting the gain in weight periodically. The formula and moisture absorption details for each sample are given in Table B.

Separate portions of each of these samples are tested for moisture resistance and strength by exposing 1½ inch by 2 inches diameter samples to moisture saturated air at 75°F. The weight and compressive strength of each sample are measured periodically. Compressive strength is measured using an Instron machine according to ASTM method D1621-64 with samples 1½ inch by 2 inches diameter. Measurements and test results of these samples are given in Table C.

EXAMPLE IV

Foam samples are prepared using a laboratory model pressurized foam mixer and sprayer under room conditions.

The mixer vessel is a 6.0 inch diameter, 12 inch long stainless steel cylinder of about 5.3 liter capacity with a conical bottom and a removable pressure tight top. A mixer shaft passes through a gas pressure sealing gland in the mixer top. The shaft is driven by an electric motor and operates a combination propellor-open paddle mixing blades in the vessel. A gauge is provided to observe the shaft speed during mixing which rotates initially at about 400 r.p.m. in the aqueous silicate which has a Brookfield viscosity of about 450 centipoises at 75°F. A gas conduit connection is provided in the vessel top to add gaseous ingredients and to pressurize the vessel during mixing with gaseous blowing agent. An evacuation and spray hose connection is provided at the apex of the conical bottom so that the foam can be withdrawn as mixing continues.

After the dry and liquid foam ingredients, except blowing agent, are added to the mixing vessel according to the recipe of Example I, the vessel is closed, sealed and pressurized with air at about 80 p.s.i.g. The type and amount of gelling agent used is shown in Table D. The mixer is started immediately. After mixing about three minutes, the mixer speed drops significantly from about 400 to about 250 r.p.m., at which time the foam is forced through the bottom hose connection and sprayed onto vertical 2 feet by 2 feet cardboard sheets through a convention plaster spray nozzle using an air to slurry ratio at the nozzle of about 15:1. Foam coagulation and sag characteristics are measured. These measurements are given in Table D.

EXAMPLE V

Air-sprayed foam samples are prepared under room conditions using the recipe and procedure of Example IV. The type and amount of gelling agent used for each sample is given in Table E.

Each foam sample is horizontally air-sprayed onto vertical rectangular sections of 16 ounces fire-retardant jute brattice cloth. After curing at room conditions for several days, 6 inches by 10 inches test specimen are cut from each rectangle. Each specimen is tested for strength and flexibility up to failure using an Instron machine. Each speciment is placed on a pair of horizontal metal bars, 6 inches long with ⅜ inch diameter, spaced 6 inches apart. A 6 inch long, ⅜inch diameter rod is moved downward at the center of the specimen by the Instron machine at a rate of ½ inch per minute. The force and displacement of the rod are measured. The specimen conditions, measured values and calculated bending angle at failure are given in Table E.

EXAMPLE VI

Foam samples are prepared according to the recipe and procedure of Example IV using 0.8 pph linoleic acid gelling agent at various temperatures.

Prior to mixing the aqueous silicate is heated to the desired temperature in the mixing vessel using an electrical heating tape wrapped around the vessel. The ingredients are mixed and poured under 80 p.s.i.g. air pressure using no nozzle air into 6 inches by 6 inches diameter cylindrical molds.

Various specimen of each sample were tested periodically to determine the hardening time at room conditions required to produce a non-sagging foam shape. The hardening time and foam density were measured and are given in Table F.

EXAMPLE VII

Foam samples are prepared by the procedure of Examples I and IV using various gelling agents and applied to coal or shale for adhesion measurements.

The mechanically foamed silicate prepared according to Example I are mixed about 3 minutes then poured onto an irregularly shaped coal block approximately 4 inches × 4 inches × 2 inches thick. A 4 inch piece of 1 inch diameter carbon steel pipe is embedded in the foam. The samples are cured under room conditions for four days and the force of adhesion is measured using an Instron machine. These adhesion values are given in Table G.

Air-sprayed foam samples are prepared according to the procedure of Example IV. Each foam sample is mixed for about 23 minutes under 80 p.s.i.g. air pressure then sprayed onto coal or shale specimen, cured for seven days and adhesion measured as above. The measured values are given in Table G.

EXAMPLE VIII

Four sets of five samples are prepared according to the recipe and procedure of Example IV, except for the gelling agent which is as shown in Table H.

Each set of samples is poured into molds to form 2⅛ inches diameter by 3 inches high and then cured. Two sets of samples, i.e. Nos. 1 and 3, are cured under room conditions at about 50% humidity for seven weeks. The other sets of samples are cured under room conditions for three weeks, immersed in 4½ liters of stirred deionized water at 75°F. for 10 days, then dried under room conditions for about 2½ weeks to constant weight. Density is measured. Compression tests are conducted on each sample as in Examples III using 2⅛ inches diameter by 2⅛ inches high cut specimen and an Instron head rate of 0.1 inch per minute. The results of these tests and measurements are given in Table H and Table I. The deionized water used to immerse the above samples is analyzed for material leached from the foam samples. Results of these analyses are given in Table I.

EXAMPLE IX

Silicate foam samples are prepared according to the procedure of Example I using 79 parts sodium silicate solution, 2 parts glass fibers, and the amount of sodium fluorosilicate, filler and gelling agent shown in Tables J and K. Each sample is poured onto a sheet of polyvinylidene chloride sheet forming a slab 30 inches, by 6 inches and about ¼ inch thick. The samples are cured under room conditions of about 65°–80°F and 30–50% humidity for the period indicated in the Tables. Typical shrinkage indicated in Tables J and K is the decrease in length each sample along the 30 inch side expressed as percent of the length. Vermiculite as used herein is a thermally expanded mica having a bulk density of about 4–6 pounds per cubic foot ($lb/ft^3$) or about 96 kilogram per meter cube ($kg/m^3$); a specific heat of about 0.2; a specific gravity of about 2.6; thermal conductivity (k) of about 0.4–0.5 Btu in/$ft^2h°F$ or $\lambda$ of about 0.05–0.06 k cal m/$m^2h°C$; a melting point of about 2,400°F (1,315°C); a sintering point of about 2,300°F (1,260°C); and a pH about 7.0. Unexpanded or crude vermiculite which has not been thermally expanded or exfoliated has a bulk density of about 40–60 $lb/ft^3$. Its chemical composition shows major parts of the oxides of silicon, aluminum, magnesium, iron, potassium and titanium combined with water and minor parts of other oxides. Perlite is a volcanic glass which can also be thermally expanded forming a porous hard particle. Expanded vermiculite particles are firm, resilient, relatively inert particles. Typical particle size distributions are shown in Table L.

TABLE A

| | | | | | | | | | | |
|---|---|---|---|---|---|---|---|---|---|---|
| | STRENGTH AND WATER RESISTANCE OF SODIUM SILICATE FOAM | | | | | | | | | |
| Sample | Components[1] pph Gelling Agent | | | Initial Dry Density, lb/ft(3) | % Change in[3] Wt. on Water Exposure | | % Change in Final Dry Wt. (After 1 Wk.)[4] | Compressive Strength, PSI(5) | | % Retention |
| No. | Crofatol 30 | Acetamide | Formamide | | 1 min. | 24 hrs. | | Initial | Final[4] | |
| 1[2] | 0.8 | — | — | 31.6 | +78.0 | +86.3 | −21.2 | 282 Sheared | 32 Sheared | 11.3 |
| 2 | — | 1.6 | 1.2 | 46.0 | +8.2 | +44.1 | −8.9 | 808 Sheared | 1,275 Sheared | 158.0 |

TABLE A-continued

STRENGTH AND WATER RESISTANCE OF SODIUM SILICATE FOAM

| Sample No. | Components[1] pph Gelling Agent | | | Initial Dry Density, lb/ft(3) | % Change in[3] Wt. on Water Exposure | | % Change in Final Dry Wt. (After 1 Wk.)[4] | Compressive Strength, PSI(5) | | % Retention |
|---|---|---|---|---|---|---|---|---|---|---|
| | Crofatol 30 | Acetamide | Formamide | | 1 min. | 24 hrs. | | Initial | Final[4] | |
| 3 | — | 0.82 | 0.67 | 43.7 | +6.2 | +56.9 | −7.7 | 1,117 Sheared | 1,400 Sheared | 125.0 |
| 4 | — | 0.2 | 0.17 | 53.8 | +7.3 | +35.7 | −20.2 | 1,175 Sheared | 1,058 Sheared | 90.0 |
| 5 | — | 0.1 | 0.86 | 63.0 | +4.7 | +31.6 | −21.2 | 1,900 Sheared | 1,583 Sheared | 83.4 |
| 6 | — | 0.74 | 0.0 | 64.3 | +4.3 | +22.3 | −28.0 | 1,508 Sheared | 1,533 Sheared | 102.0 |
| 7 | — | 0.0 | 0.74 | 68.6 | +3.8 | +18.9 | −27.5 | 1,315 Sheared | 1,600 Sheared | 122.0 |
| 8 | — | 0.4 | 0.34 | 91.1 | +0.3 | 0.0 | −40.2 | 427 Collapsed | 250 Collapsed | 58.5 |

[1]Composition contains the components as described in Example 1 plus gelling agent as indicated.
[2]Prior art composition.
[3]Samples submerged below a depth of 2 inches in 75°F. deionized water. All % weight changes are referenced to initial dry weight of sample.
[4]Wet samples dried in room atmosphere at 75°F. and reached constant weight after one week.
[5]At 5% deformation, Instron head rate of 0.1" per minute using ASTM procedure D1621-64. Samples were 2" diameter cylinders approximately 2" high.

TABLE B

MOISTURE ABSORPTION OF SODIUM SILICATE FOAM[1]

| Sample No. | Components, pph Gelling Agent | | Increase in Weight, Percent[3] | | | | | | | | |
|---|---|---|---|---|---|---|---|---|---|---|---|
| | No. 1 | No. 2 | 1 day | 2 days | 3 days | 4 days | 5 days | 6 days | 1 week | 2 weeks | 3 weeks |
| 1[2] | 1 Crofatol 30 | — | 5.9 | 7.5 | 8.5 | 9.0 | 10.0 | 10.8 | 10.9 | 7.0 | 6.9 |
| 2[2] | 1 Crofatol 30 | — | 3.6 | 4.7 | 5.5 | 6.0 | 6.8 | 7.1 | 7.4 | 8.0 | 8.0 |
| 3 | 1 Oleic Acid | — | 4.4 | 5.5 | 6.4 | 6.4 | 7.0 | 7.0 | 7.0 | 7.8 | 9.4 |
| 4 | 1 Linoleic Acid | — | 4.0 | 5.9 | 8.0 | 9.5 | 11.0 | 12.0 | 11.5 | 11.4 | 11.3 |
| 5 | ¼ Acetamide | ¼ Formamide | 2.7 | 5.3 | 7.7 | 9.0 | 10.8 | 12.0 | 12.1 | 15.5 | 18.2 |
| 6 | ¼ Amides | ¾ Linoleic Acid | 4.0 | 6.6 | 7.9 | 8.6 | 9.9 | 10.2 | 10.2 | 9.8 | 10.9 |

[1]Samples were placed in a sealed vessel and exposed to air saturated with water vapor (75°F.) and weighed at periodic intervals.
[2]Prior art composition.
[3]Relative to initial dry weight.

TABLE C

MOISTURE RESISTANCE OF SILICATE FOAM

| Sample No. | Initial Dry Density[2] lb/cu-ft. | % Increase[3] in Weight Upon Exposure to Moist Air | | Compressive Strength, psi[4] | | % Retention |
|---|---|---|---|---|---|---|
| | | 2 Weeks | 3 Weeks | Initial | Final[5] (After 3 Weeks) | |
| 1[1] | 32.3 | 7.0 | 6.9 | 85 | 65 | 76 |
| 2[1] | 31.8 | 8.0 | 8.0 | 110 | 70 | 64 |
| 3 | 35.6 | 7.8 | 9.4 | 110 | 80 | 73 |
| 4 | 32.5 | 11.4 | 11.3 | 115 | 100 | 87 |
| 5 | 41.9 | 15.5 | 18.2 | 1,240 | 1,000 | 80 |
| 6 | 37.2 | 9.8 | 10.9 | 110 | 85 | 77 |

[1]Prior art composition.
[2]Immediately prior to water vapor exposure.
[3]Relative to initial dry weight.
[4]At 5% deformation; Instron head rate of 0.1" per minute. Samples were 2" diameter cylinders approximately 1½" high. Compressive strength run by ASTM procedure D1621-64.
[5]Immediately after water vapor exposure.

TABLE D

AIR-SPRAYED SILICATE FOAM CHARACTERISTICS

| Sample No. | Components, pph Gelling Agent | | | Foam[1] Coagulation Time, hrs. | "Sag-Distance"[2] Moved By Foam, inches |
|---|---|---|---|---|---|
| | No. 1 | No. 2 | No. 3 | | |
| 1 | 0.8 linoleic | — | — | 2 | 3 |
| 2 | 0.3 linoleic | 0.9 acetamide | — | 1¼ | 2 |
| 3 | 0.4 linoleic | 1.2 acetamide | — | ¾ | 1 |
| 4 | 0.5 linoleic | 1.5 acetamide | — | ½ | ½ |
| 5 | 0.3 linoleic | — | 0.9 formamide | 1 | 2½ |
| 6 | 0.4 linoleic | — | 1.2 formamide | 1 | 1½ |

TABLE D-continued

AIR-SPRAYED SILICATE FOAM CHARACTERISTICS

| Sample No. | Components, pph No. 1 | Gelling Agent No. 2 | No. 3 | Foam[1] Coagulation Time, hrs. | "Sag-Distance"[2] Moved By Foam, inches |
|---|---|---|---|---|---|
| 7 | 0.5 linoleic | — | 1.5 formamide | ¾ | 1 |
| 8 | 0.3 linoleic | 0.46 acetamide | 0.46 formamide | 1 | 1 |
| 9 | 0.4 linoleic | 0.6 acetamide | 0.6 formamide | 1 | ½ |
| 10 | 0.5 linoleic | 0.76 acetamide | 0.76 formamide | ¾ | ¼ |
| 11 | — | 0.8 Na formate | — | ½ | ¼ |
| 12 | 0.2 linoleic | 0.6 Na formate | — | 1¾ | 2 |
| 13 | 0.3 linoleic | 0.9 Na formate | — | 1¼ | 1 |
| 14 | 0.4 linoleic | 1.2 Na formate | — | ¾ | ½ |
| 15 | 0.5 linoleic | 1.5 Na formate | — | ¾ | ¼ |

[1]Foam coagulation time is the minimum time required for this first coat of foam to support a second coat of foam.
[2]Vertical downward distance moved by foam areas <¼-inch thick.

TABLE E

FLEXIBILITY OF AIR-SPRAYED SILICATE FOAM

| Sample No. | Components, pph Gelling Agent No. 1 | No. 2 | Foam Curing Time, Days | Foam Thickness Inches | Applied Force, Pounds | Instron Displacement, d, Inches | Bending Angle, θ |
|---|---|---|---|---|---|---|---|
| 1[1] | 1 Crofatol 30 | — | 26 | 3/32 | 6.1 | 0.81 | 15° |
| 2[1] | 1 Crofatol 30 | — | 26 | 1/16 | 5.0 | 1.09 | 20° |
| 3[1] | 1 Crofatol 30 | — | 19 | 1/16 | 1.16 | 1.20 | 22° |
| 4[1] | 1 Crofatol 30 | — | 19 | 1/16 | 1.10 | 1.16 | 22° |
| 5[1] | 1 Crofatol 30 | — | 6 | 1/32 | 0.79 | 1.18 | 22° |
| 6[1] | 1 Crofatol 30 | — | 6 | 1/16 | 2.32 | 1.20 | 22° |
| 7 | 1 Oleic Acid | — | 13 | 1/16 | 1.90 | 0.79 | 15° |
| 8 | 1 Oleic Acid | — | 13 | 1/16 | 1.78 | 0.74 | 14° |
| 9 | 1 Linoleic Acid | — | 12 | 1/16 | 1.04 | 1.25 | 23° |
| 10 | 1 Linoleic Acid | — | 12 | 1/32 | 0.76 | 1.34 | 24° |
| 11 | ½ Acetamide | ½ Formamide | 11 | 1/16 | 2.75 | 1.24 | 24° |
| 12 | ½ Acetamide | ½ Formamide | 11 | 1/16 | 3.45 | 0.94 | 17° |
| 13 | ½ Amides | ½ Linoleic Acid | 7 | 1/16 | 1.24 | 0.81 | 15° |
| 14 | ½ Amides | ½ Linoleic Acid | 7 | 1/16 | 1.14 | 0.94 | 17° |

[1]Prior art composition.

TABLE F

EFFECT OF TEMPERATURE ON SODIUM SILICATE FOAM

| Sample No. | Vessel Mixing Time, Min. | Temperature of Ingredients, °F. | Foam Density, lb/cu-ft | Estimated Foam Hardening Time, hrs. |
|---|---|---|---|---|
| 1 | 3 | 75 | 14.0 | 20 |
| 2 | 3 | 85 | 13.2 | 10 |
| 3 | 2 | 90 | 17.9 | 8 |
| 4 | 1 | 95 | 26.7 | 3 |
| 5 | ¾ | 105 | — | ¼ |

TABLE G

ADHESION OF SILICATE FOAM

| Sample No. | Components, pph Gelling Agent No. 1 | No. 2 | No. 3 | Adhesion to Coal, psi Mechanically Foamed | Air-Sprayed | Adhesion to Shale, psi Air-Spray |
|---|---|---|---|---|---|---|
| 1[1] | 1 Crofatol 30 | — | — | 1.9 | 4.7 | 13.9 |
| 2 | 1 Oleic Acid | — | — | 5.3 | — | — |
| 3 | 1 Linoleic Acid | — | — | 2.2 | 3.9 | 13.0 |
| 4 | ½ Acetamide | ½ Formamide | — | 3.3 | — | — |
| 5 | 0.4 Acetamide | 0.4 Formamide | 0.2 Linoleic Acid | — | 6.3 | 41.4 |

[1]Prior art composition.

TABLE H

WATER IMMERSION OF SODIUM SILICATE FOAMS

| Sample No. | Exposed to Water | Components, pph Gelling Agent Crof.-30[3] | Amides[2] | Density, lb/cu-ft | Compressive Strength psi | Final Dry Foam Properties (after 7 weeks) % Deformation at 1st Break | Ratio: psi lb/cu-ft | Young's Modulus F/A/d/l | % Deformation Over Load-Bearing Range |
|---|---|---|---|---|---|---|---|---|---|
| 1[1] | No | 0.8 | — | 32.7 | 128.5±9.6 | 4.7±0.2 | 3.93 | 2711±290 | — |
| 2[1] | Yes | 0.8 | — | 24.4 | 82.3±9.3 | 4.3±0.7 | 3.37 | 1910±450 | — |
| 3 | No | — | 0.8 | 32.0 | 149.0±9.8 | 5.5±0.7 | 4.66 | 2704±460 | 23 |
| 4 | Yes | — | 0.8 | 26.9 | 154.4±9.6 | 3.7±0.7 | 5.74 | 4207±880 | 23 |

[1]Prior art composition.
[2]Crofatol-30.
[3]0.3 parts acetamide, 0.3 parts formamide plus 0.2 parts linoleic acid.

TABLE I

WATER LEACHING SILICATE FOAMS

| Sample Nos. | Initial Dry Weight, gm. | % Change in Wet Wt. on Water Immersion | | | % Change in Final Dry Weight | Amount of Components in Water Extract, gm | | | |
|---|---|---|---|---|---|---|---|---|---|
| | | 2 hrs | 24 hrs | 10 days | | NaF | $Na_2SiF_6$ | $Na_2SiO_3$ | Total |
| 1 & 2 | 496.5 | +65.6 | +63.4 | +74.5 | −25.4 | 63.6 | 6.3 | 20.8 | 90.7 |
| 3 & 4 | 532.2 | +56.4 | +53.5 | +65.6 | −22.8 | 51.1 | 20.4 | 19.5 | 91.0 |

TABLE J

SHRINKAGE OF SODIUM SILICATE FOAMS, COMPONENTS PPH.[1]

| Sample No. | Glass Fibers | $Na_2SiF_6$ | Filler | Tall Oil | Hardener Formamide | Curing Time, Weeks | Percent Shrinkage |
|---|---|---|---|---|---|---|---|
| 1 | 2 (2%) | 14 (14%) | — | 1 (1%) | — | 5 | 3.2 |
| 2 | 2 | 14 | — | 1 | — | 12 | 3.2 |
| 3 | 2 | 12 | — | 1 | — | 5 | 3.4 |
| 4 | 2 (2.1%) | 10 (10.4%) | — | 1 (1%) | — | 5 | 3.0 |
| 5 | 2 | 14 | 2 Verm. I | 1 | — | 4 | 3.1 |
| 6 | 2 | 14 | 4 Verm. I | 1 | — | 4 | 2.1 |
| 7 | 2 (1.9%) | 14 (13.3%) | 5 Verm. I (4.8%) | 1 (1.0%) | — | 4 | 1.6 |
| 8 | 2 | 14 | — | — | 1 | 4 | 1.0 |
| 9 | 2 | 14 | 5 Verm. I | — | 1.5 | 5 | 0.6 |
| 10 | 2 | 10 | 5 Verm. I | — | 1.5 | 5 | 0.8 |
| 11 | 2 (1.9%) | 16 (15.0%) | 5 Verm. I (4.7%) | — | 1 (0.9%) | 2 | 0.4 |
| 12 | 2 (1.9%) | 14 (13.3%) | 5 Verm. I (4.8%) | — | 1 (1.0%) | 5 | 0.5 |
| 13 | 2 (2.0%) | 10 (9.9%) | 5 Verm. I (4.9%) | — | 1 (1.0%) | 5 | 0.5 |
| 14 | 2 | 16 | 5 Verm. I | — | 0.5 | 2 | 0.2 |
| 15 | 2 | 14 | 5 Verm. I | — | 0.5 | 5 | 0.4 |
| 16 | 2 | 10 | 5 Verm. I | — | 0.5 | 5 | 0.7 |
| 17 | 2 (1.9%) | 14 (13.1%) | 7 Verm. I (6.5%) | — | 1 (0.9%) | 2 | 0.2 |
| 18 | 2 (1.8%) | 14 (12.8%) | 9 Verm. I (8.3%) | — | 1 (0.9%) | 2 | 0.1 |
| 19 | 2 | 14 | 5 Verm. I | — | 1 | 5 | 0.5 |
| 20 | 2 | 14 | 5 Verm. II | — | 1 | 2 | 0.3 |
| 21 | 2 | 14 | 5 Verm. III | — | 1 | 2 | 0.3 |
| 22 | 2 (1.9%) | 14 (13.3%) | 5 Perlite (4.8%) | — | 1 (1.0%) | 5 | 0.4 |
| 23 | 2 (2.0%) | 10 (9.9%) | 5 Perlite (4.9%) | — | 1 (1.0%) | 5 | 0.4 |

[1] Parts per hundred parts of foam by weight

TABLE K

EFFECT OF TYPE OF AMIDE HARDENER ON SHRINKAGE OF SODIUM SILICATE FOAMS

| Sample No. | Components, pph[1] | | Amide Hardener | Curing Time, Weeks | Percent Shrinkage |
|---|---|---|---|---|---|
| | $Na_2SiF_6$ | Filler | | | |
| 1 | 14 | — | 1 Formamide | 4 | 1.0 |
| 2 | 14 | 5 Vermiculite I | 1 Formamide | 5 | 0.5 |
| 3 | 14 | — | 1 Propionamide | 3 | 1.3 |
| 4 | 14 | 5 Vermiculite I | 1 Propionamide | 3 | 1.1 |
| 5 | 14 | — | 1 Nonamide | 3 | 0.24 |
| 6 | 14 | 5 Vermiculite I | 1 Nonamide | 3 | 0.12 |
| 7 | 14 | — | 1 Stearamide | 3 | 0.4 |
| 8 | 14 | 5 Vermiculite I | 1 Stearamide | 3 | 0.25 |
| 9 | 14 | — | 1 Benzene Sulfonamide | 3 | 0.7 |
| 10 | 14 | — | 1 Malonamide | 3 | 0.7 |

[1] Parts per hundred parts of mixture by weight

TABLE L

TYPICAL VERMICULITE PARTICLE SIZE PERCENT BY WEIGHT RETAINED ON SIEVE

| Grade Sieve[1] No. | I Fine | II Medium | III Coarse |
|---|---|---|---|
| 3 | — | — | — |
| 6 | — | 0 | 6.0 |
| 8 | — | 2.9 | 53.6 |
| 10 | — | — | 66.5 |
| 16 | 13.3 | 83.7 | 94.9 |
| 20 | 41.8 | — | 99.3 |
| 30 | 84.4 | 98.4 | — |
| 40 | 96.7 | — | — |
| 50 | — | 99.7 | — |
| 100 | — | 100.0 | — |

[1] Sieve or mesh number is Standard Tyler Screen Size designation.

We claim:

1. A composition for producing a fire-resistant, high strength, low shrinkage silicate foam having high water resistance being an aqueous silicate dispersion mixed with about 45–60 parts water on the basis of 100 parts by weight of foam comprising the following ingredients mixed with said water;
   a. about 25–36 parts water soluble alkali metal silicate;
   b. about 8–20 parts cementing agent selected from the group consisting of sodium silicofluoride, zinc carbonate, magnesium carbonate, aluminum phosphate, zinc acetate and a mixture thereof;
   c. about 0.2–6 parts gelling agent selected from the group consisting of low molecular weight amide and a mixture of amide and haloalcohol;
   d. about 0.1–10 parts fibrous filler;

e. about 0.1–20 parts particulate filler selected from the group consisting of vermiculite, perlite and a mixture thereof;

with the water soluble alkali metal silicate, the cementing agent, the gelling agent, the fibrous filler and the particulate filler being uniformly mixed with the water forming a foamed aqueous suspension in aqueous silicate.

* * * * *